US006563655B1

(12) United States Patent
Yamasaki et al.

(10) Patent No.: US 6,563,655 B1
(45) Date of Patent: May 13, 2003

(54) METHOD AND APPARATUS FOR FAILSAFING AND EXTENDING RANGE FOR WRITE PRECOMPENSATION

(75) Inventors: Richard G. Yamasaki, Torrance, CA (US); Tomoaki Ohtsu, Yokohama (JP); Kiyoshi Fukahori, Tsukuda Chuo Ku (JP)

(73) Assignee: Texas Instruments Incorporated, Dallas, TX (US)

( * ) Notice: Subject to any disclaimer, the term of this patent is extended or adjusted under 35 U.S.C. 154(b) by 1120 days.

(21) Appl. No.: 08/650,850

(22) Filed: May 20, 1996

(51) Int. Cl.[7] .................................................. G11B 5/09
(52) U.S. Cl. ............................ 360/45; 360/51; 360/46; 360/68
(58) Field of Search .............................. 360/39, 25, 45, 360/51, 65, 46, 68; 327/175

(56) References Cited

U.S. PATENT DOCUMENTS 5,493,454 A * 2/1996 Ziperovich et al. ........... 360/46
5,594,377 A * 1/1997 Choi et al. ................... 327/278

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

Catastrophic failures of a write precompensation circuit are prevented from occurring without limiting the precompensation range to a small value and the range of precompensation is extended beyond limits imposed by the duty cycle of the clock signal. Catastrophic failure of the write precompensation circuit is prevented by ORing either the input or the output of the comparator and the opposite phase of the clock. The 180 degree delayed clock forces any transitions that would otherwise have been missed. The range of a write precompensation circuit is extended by ORing the clock and the clock delayed by a time td. The extended duty cycle that results is used to generate a longer precompensation delay. A technique is also provided to maintain constant duty cycle over a broad range of data rates.

6 Claims, 11 Drawing Sheets

METHOD AND APPARATUS FOR FAILSAFING AND EXTENDING RANGE FOR WRITE PRECOMPENSATION

BACKGROUND OF THE INVENTION

1. Field of the Invention

The present invention relates to data processing and data storage, and more particularly to precompensation of write data signals.

2. Background Art

Computer systems employ data storage devices, for example, disk drives, to store data for use by the computer system. A typical data storage device includes storage media, in which data is stored, a read head, and a mechanism, such as a motor, for imparting relative motion between the storage media and the read head. The relative motion allows access to various portions of the storage media, and, in the case of certain types of media, such as magnetic media, allows for the production of signals representative of the data stored in the storage media.

In general, disk memories are characterized by the use of one or more magnetic media disks mounted on a spindle assembly and rotated at a high rate of speed. Each disk typically has two surfaces of magnetic media. In a typical rotating medium as a storage system, data is stored on magnetic or magneto-optical disks in a series of concentric "tracks," with each track being an addressable area of the memory array. A read/write head is provided for each surface of each disk in the disk storage system. These tracks are accessed by read/write head that detects variations in the magnetic orientation of the disk surface.

To provide retrieval of stored data from a storage medium, the fixed representation of the stored data in the storage medium must be converted into signal that may be processed to yield data in a form usable with a system such as a computer system. A read channel circuit is used to convert signals from the storage media to usable read data.

Information is often provided to a read channel in a bit stream format. A bit stream consists of a series of logical ones or zeros presented in serial fashion. To accurately decode a serial bit stream, the read channel must be able to detect each individual bit. To isolate each bit, a bit frame or bit window is defined about each bit. A bit window should only contain a single bit. If the window is too large, more than one bit of information may be contained within the window and one or all bits may be lost. If the bit window is too small, no detectable information will result. Further, loss of bit information at point locations may lead to error propagation throughout the decoding process.

A read channel circuit is used to read data from a storage device, for example a hard disk drive. A read channel circuit typically includes a pulse detector, a filter, servo circuits, a data synchronizer, a window shift circuit, a write precompensation circuit, an encoder/decoder (ENDEC), and a control circuit. The pulse detector detects and qualifies encoded read signals derived from the storage device. The filter further processes the encoded read signals to ensure frequency range and phase relationships of the encoded read signals are appropriate to allow read data to be recovered from the encoded read signals. The servo circuits capture servo information derived from the storage device which is used to assure that data to be read from the storage device has been accurately located.

In the read mode, the data synchronizer performs sync field search and data synchronization. The data synchronizer uses a phase locked loop (PLL) to provide data synchronization and to develop a decode window. The window shift circuit shifts the phase of the voltage controlled oscillator (VCO) of the PLL to effectively shift the relative position of the read data pulse within the decode window. In the write mode, the write precompensation circuit uses the data synchronizer to provide data encoding and independent late/early write precompensation for NRZ data. The ENDEC provides encoding and decoding, preferably of run length limited (RLL) signals. The control circuit coordinates and controls the operation of the aforementioned circuits and subsystems.

A write precompensation circuit provides write precompensation. Write precompensation compensates for media bit shift caused by magnetic nonlinearities. Specific write data patterns are recognized and delays are added in the time position of write data bits to counteract the effects of the magnetic nonlinearities. The magnitude of the time shift required depends on the specific nonlinearities of the particular magnetic media involved. Therefore, the amount of precompensation is typically be made programmable to allow users the flexibility to set the amount needed in specific applications. Pre-compensation is performed only on the second of two consecutive "ones" in a write data stream and shifts the time position of the write data bits in only the late direction. If more than two consecutive "ones" are written in a write data stream, all but the first are precompensated in the late direction.

FIG. 1 is a schematic diagram illustrating a typical write precompensation circuit.

Circuit 101 is a portion of the circuit of FIG. 1. Circuit 101 comprises transistors 106, 107, 111, 113, 114, 117, 118, 121, 122, 123, 124, 128, 129, 133, 134, 137, 138, 139, 140, 146 and 147. Circuit 101 comprises resistors 108, 109, 112, 119, 120, 125, 126, 127, 131, 132, 136, 141, 142 and 148. Circuit 101 comprises capacitor 115, current source 130 and variable current source 149.

The circuit of FIG. 1 comprises timing generator 102 and comparator 103. Timing generator 102 comprises transistors 106, 107, 111, 113, 114, 117 and 118. Timing generator 102 comprises resistors 108, 109, 112, 119 and 120. Timing circuit 102 comprises capacitor 115. Comparator 103 comprises transistors 133, 134, 135, 137, 138, 139, 140, 146 and 147. Comparator 103 comprises resistors 131, 132, 136, 141, 142 and 148. Comparator 103 comprises variable current source 149.

Input CLK at node 104 is coupled to the base of transistor 106 and to the base of transistor 129. Input CLK* at node 105 is coupled to the base of transistor 107 and to the base of transistor 128. Positive voltage supply V+ at node 150 is coupled to a first terminal of resistor 108 and to a first terminal of resistor 109. A second terminal of resistor 108 is coupled to node 152, at which signal Vno is present, to the collector of transistor 106 and to the base of transistor 114. A second terminal of resistor 109 is coupled to node 153, at which signal Vpo is present, to the collector of transistor 107 and to the base of transistor 113.

Input Vbias at node 110 is coupled to the base of transistor 111, to the base of transistor 123, to the base of transistor 124, to the base of transistor 135, to the base of transistor 139 and to the base of transistor 140. The emitter of transistor 111 is coupled to a first terminal of resistor 112. The second terminal of resistor 112 is coupled to ground at node 151. The collector of transistor 111 is coupled to the emitter of transistor 106 and to the emitter of transistor 107.

Positive voltage supply V+ at node 150 is coupled to the collector of transistor 113 and to the collector of transistor 114. The emitter of transistor 113 is coupled to the base of transistor 122, to a first terminal of capacitor 115, to the collector of transistor 117, and to node 154, at which signal Vcp is present. The emitter of transistor 114 is coupled to the base of transistor 121, to the second terminal of capacitor 115, to the collector of transistor 118, and to node 155, at which signal Vcn is present.

Voltage Vc is measured across capacitor 115, with node 154 being the positive terminal and node 155 being the negative terminal for the purposes of measurement. The emitter of transistor 117 is coupled to a first terminal of resistor 119. The second terminal of resistor 119 is coupled to ground at node 151. The emitter of transistor 118 is coupled to a first terminal of resistor 120. The second terminal of resistor 120 is coupled to ground at node 151. Input VADJ at node 116 is coupled to the base of transistor 117 and to the base of transistor 118.

Positive voltage supply V+ at node 150 is coupled to the collector of transistor 121 and to the collector of transistor 122. The emitter 121 is coupled to the collector 123, to the collector of transistor 128, and to a first terminal of resistor 127. The emitter of transistor 122 is coupled to the collector of transistor 124, to the collector of transistor 146, and to a first terminal of resistor 148. The emitter of transistor 123 is coupled to a first terminal of resistor 125. The emitter of transistor 124 is coupled to a first terminal 126. The second terminal of resistor 125 and the second terminal of resistor 126 are coupled to ground at node 151. The emitter of transistor 128 and the emitter of transistor 129 are coupled to a first terminal of current source 130. The second terminal of current source 130 is coupled to ground at node 151.

Current IE is measured through current source 130. The second terminal of resistor 127 is coupled to the collector of transistor 129, to the base of transistor 133 and to node 156, at which signal Vin is present. The second terminal of resistor 148 is coupled to the base of transistor 134, to the collector of transistor 147, and to node 157, at which signal Vip is present.

Positive supply voltage V+ at node 150 is coupled to a first terminal of resistor 131 and to a first terminal of resistor 132. A second terminal of resistor 131 is coupled to the collector of transistor 133 and to the base of transistor 137. The second terminal of resistor 132 is coupled to the collector of transistor 134 and to the base of transistor 138. The emitter of transistor 133 and the emitter of transistor 134 are coupled to the collector of transistor 135. The emitter of transistor 135 is coupled to a first terminal of resistor 136. The second terminal of resistor 136 is coupled to ground at node 151.

Positive supply voltage V+ at node 150 is coupled to the collector of transistor 137 and to the collector of transistor 138. The emitter of transistor 137 is coupled to a negative side of a second input of AND gate 143, to a positive side of a first input AND gate 144, to the collector of transistor 139 and to node 166, at which signal 01 is present. The emitter of transistor 138 is coupled to a positive side of a second input of AND gate 143, to a negative side of a first input of AND gate 144, to the collector of transistor 140, and to node 167, at which signal O1* is present.

The emitter of transistor 139 is coupled to a first terminal of resistor 141. The emitter of transistor 140 is coupled to a first terminal of resistor 142. The second terminal of resistor 141 and the second terminal of resistor 142 are coupled to ground at node 151. Input WPL at node 158 is coupled to a noninverting side of a first input of AND gate 143. Input WPL* at node 159 is coupled to a inverting input of AND gate 143.

The noninverting output of AND gate 143 at node 168 provides output OL and is coupled to the base of transistor 147. The inverting output of AND gate 143 at node 169 provides output OL* and is coupled to the base of transistor 146. The emitter of transistor 146 and the emitter of transistor 147 are coupled to the output of digital-to-analog converter (DAC) 801 of variable current source 149 at node 809. Current IL is measured through node 809.

Input WDT is at node 160 is coupled to a noninverting side of a second input of AND gate 144. Input WDT* at node 161 is coupled to an inverting side of a second input of AND gate 144.

The noninverting output of AND gate 144 provides signal WPT at node 162 and is coupled to an noninverting input flip-flop 145. The inverting output of AND gate 144 provides signal WPT* at node 163 and is coupled to an inverting input of flip-flop 145. The noninverting output of flip-flop 145 provides output WDout at node 164. The inverting output flip-flop 145 provides output WDout* at node 165.

The emitter of transistor 146 and the emitter of transistor 147 are coupled to node 809, which is coupled to the current output of DAC 801. The current reference input of DAC 801 is coupled to a first terminal of current source 802 at node 808. A second terminal of current source 802 is coupled to ground 806 at node 807.

DAC 801 has a digital input 803 for receiving digital information. The digital information at digital input 803 may be provided to any suitable digital control means, for example a microcontroller, coupled to digital input 803. Digital input 803 may be a digital input comprising one or more nodes, with each node conveying at least one bit of digital information. For example, digital input 803 may include node 804, which conveys the most significant bit (MSB) of digital information, and node 805, which conveys the least significant bit (LSB) of digital information.

DAC 801 receives a reference current input from current source 802 and digital information from digital input 803. DAC 801 provides a current output at node 809 that is a function of the current at the reference current input and the digital information at digital input 803. Thus, by varying the digital information at digital input 803 while maintaining a constant reference current at the reference current input at node 808, the circuit comprising DAC 801 functions as a variable current source.

FIG. 1 shows a typical circuit used in realizing write precompensation. The magnitude of the precompensation is made proportional to the time base generator's VCO period which sets the basic write rate by duplicating a portion of time base generator's VCO as shown in timing generator 102 of FIG. 1.

FIG. 2 is a timing diagram illustrating waveforms and timing relationships of the signals of the circuit of FIG. 1.

FIG. 2 shows waveforms at several internal nodes. Comparator 101 of FIG. 1 compares Vip and Vin, both of which are offset from Vcp and Vcn by IL*RL and IE*RE respectively. On the rising edge of clock signal CLK at node 104, the early side, signal Vin at node 156, is set via transistors 128 and 129 and the late side, signal Vip at node 157, is set (reset) if the previous bit signal WPL was 1(0) via transistors 146 and 147 and AND gate 143. As signal Vin at node 156 ramps down, the condition of Vip>Vin is reached and the comparator fires or resets and generates a positive going transition which is passed through AND gate 144 and causes flip-flop 145 to toggle. By varying the current IL through variable current source 149, the trip point is changed and the desired time delay is generated. AND gate 144 prevents the transition from passing through unless the data WDT is valid (i.e., "1"). AND gate 143 keeps signal Vip at node 134 reset unless previous data bit signal WPL is a logical "1". Again note that the first data bit is not precompensated or delayed.

On the falling edge of the clock signal CLK at node 104, with the late side already reset by the regenerative action of the comparator via AND gate 143 and transistors 146 and 147, the early side is reset and the late side begins to ramp down. When Vin>Vip, the comparator is set again, aided by the regenerative action via AND gate 143 and transistors 146 and 147 and awaits the next data bit.

When a larger amount of write precompensation is desired, signal Vip at node 157 is set lower to delay the occurrence of the trip condition Vip>Vin. Under extreme conditions when Vip is set too low, the comparator may fail to fire and a transition may be completely missed. This is a catastrophic failure and, as such, must be avoided. Also note that the range of the precompensation is limited by the duty cycle of the basic clock to less than 50% even under ideal conditions and to much less (typically about 30%) in a real environment.

In the past, catastrophic failure has been avoided by limiting the precompensation range to a fairly small range, such as 20%, thereby allowing adequate margin for clock jitter and/or noise.

SUMMARY OF THE INVENTION

The present invention provides a method and apparatus for preventing catastrophic failure (i.e., failsafing) and extending the range of a write precompensation circuit.

The present invention prevents such catastrophic failures from occurring without limiting the precompensation range to a small value and also extends the range of precompensation beyond limits imposed by the duty cycle of clock signal CLK. In some applications, particularly at high data rates, the amount of precompensation needed might be greater than 30%. Thus, the present invention provides advantages over the prior art.

The present invention prevents catastrophic failure of a write precompensation circuit by ORing either the input (signals Vip and Vin) or the output (signals O1 and O1*) of the comparator and the opposite phase of complementary clock signals CLK and CLK*. The opposite phase of the clock signals may be obtained by interchanging (i.e., swapping) the complementary clock signals with each other.

By ORing the input or output of the comparator with the opposite phase of the clock signals, a transition is guaranteed. If the comparator fails to generate a transition due to noise or clock jitter, the 180 degree delayed clock will force a transition.

In the preferred embodiment of the present invention, elements are included to prevent narrow pulses from interfering with proper operation of the write precompensation circuit, thereby making the write precompensation circuit less susceptible to noise and jitter.

The present invention extends the range of precompensation that a write precompensation circuit is able to provide. The clock signal and the clock signal that has been delayed by a time td are ORed together to change the duty cycle of the clock signal. By ORing together the clock signal and the delayed clock signal, the present invention provides a new clock signal having a greater duty cycle. The greater duty cycle allows a write precompensation circuit according to the present invention to provide longer precompensation delay. The preferred embodiment of the present invention also provides for a correction current to be inserted in the delay circuit to maintain constant duty cycle over a broad range of data rates.

Thus, the present invention overcomes the disadvantages of the prior art.

BRIEF DESCRIPTION OF THE DRAWINGS

FIG. 3b is a timing diagram illustrating waveforms and timing relationships of the signals of the circuit in FIG. 3a.

DETAILED DESCRIPTION OF THE INVENTION

A method and apparatus for preventing catastrophic failure (i.e., failsafing) and extending the range of a write precompensation circuit is described.

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In typical write precompensation circuits, under extreme conditions when Vip is set too low, the comparator may fail to fire and a transition may be completely missed, causing a catastrophic failure of the write precompensation. While the range of the precompensation is limited to less than 50% even under ideal conditions, it is limited to much less (typically about 30%) in a real environment.

To avoid catastrophic failure in the past, it has been necessary to limit the precompensation range to a fairly narrow range, such as 20%, but such a low limit impairs the overall system performance. Thus, a technique is needed to prevent catastrophic failure of a write precompensation circuit and to extend the range over which the write precompensation circuit may operate.

The present invention avoids the disadvantages of the prior art, yet provides a solution to the problems of catastrophic failure in a write precompensation circuit and, furthermore, provides an extended operating range for a write precompensation circuit.

Figure 3A:
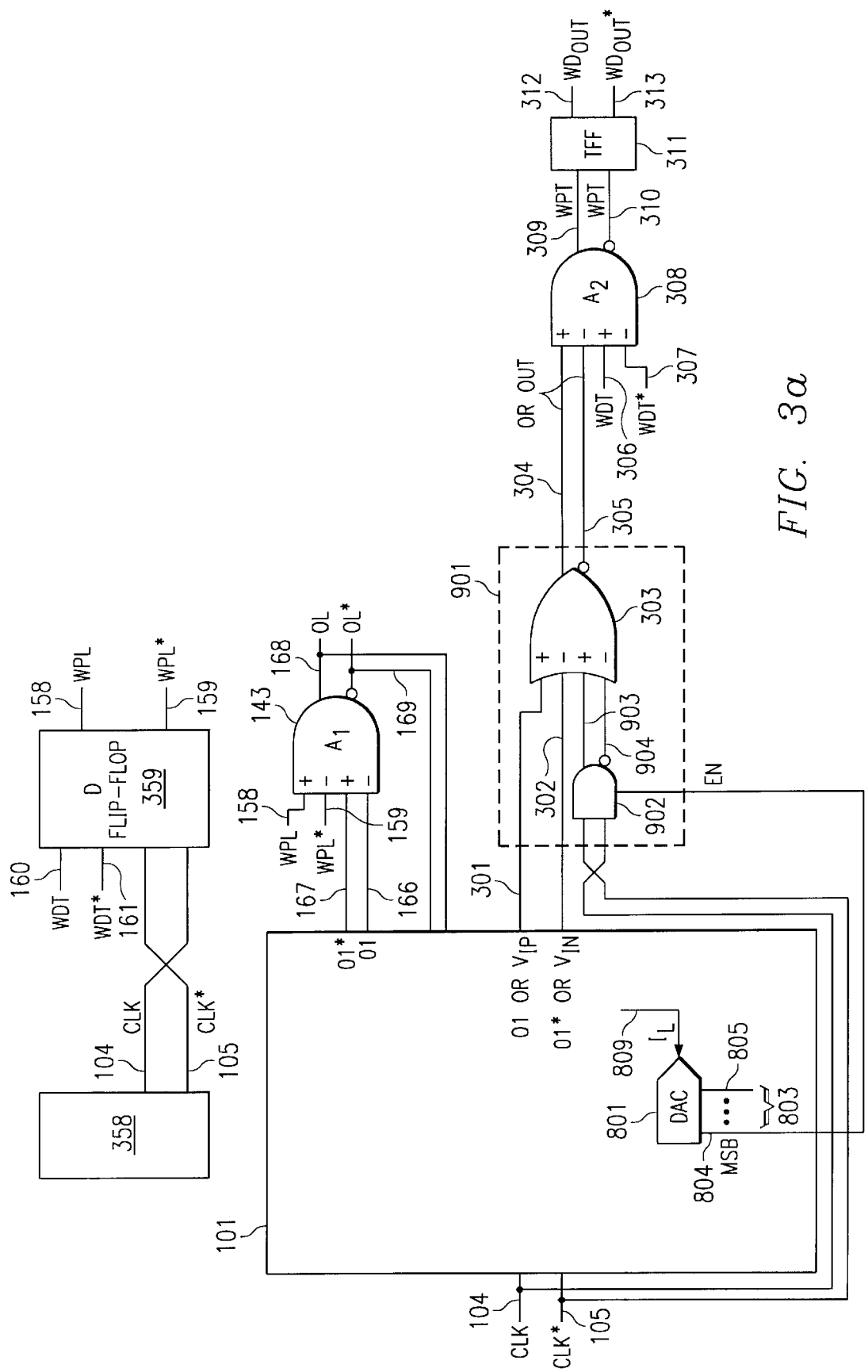
FIG. 3a is a schematic diagram illustrating an embodiment of the present invention.
Figure 3B:
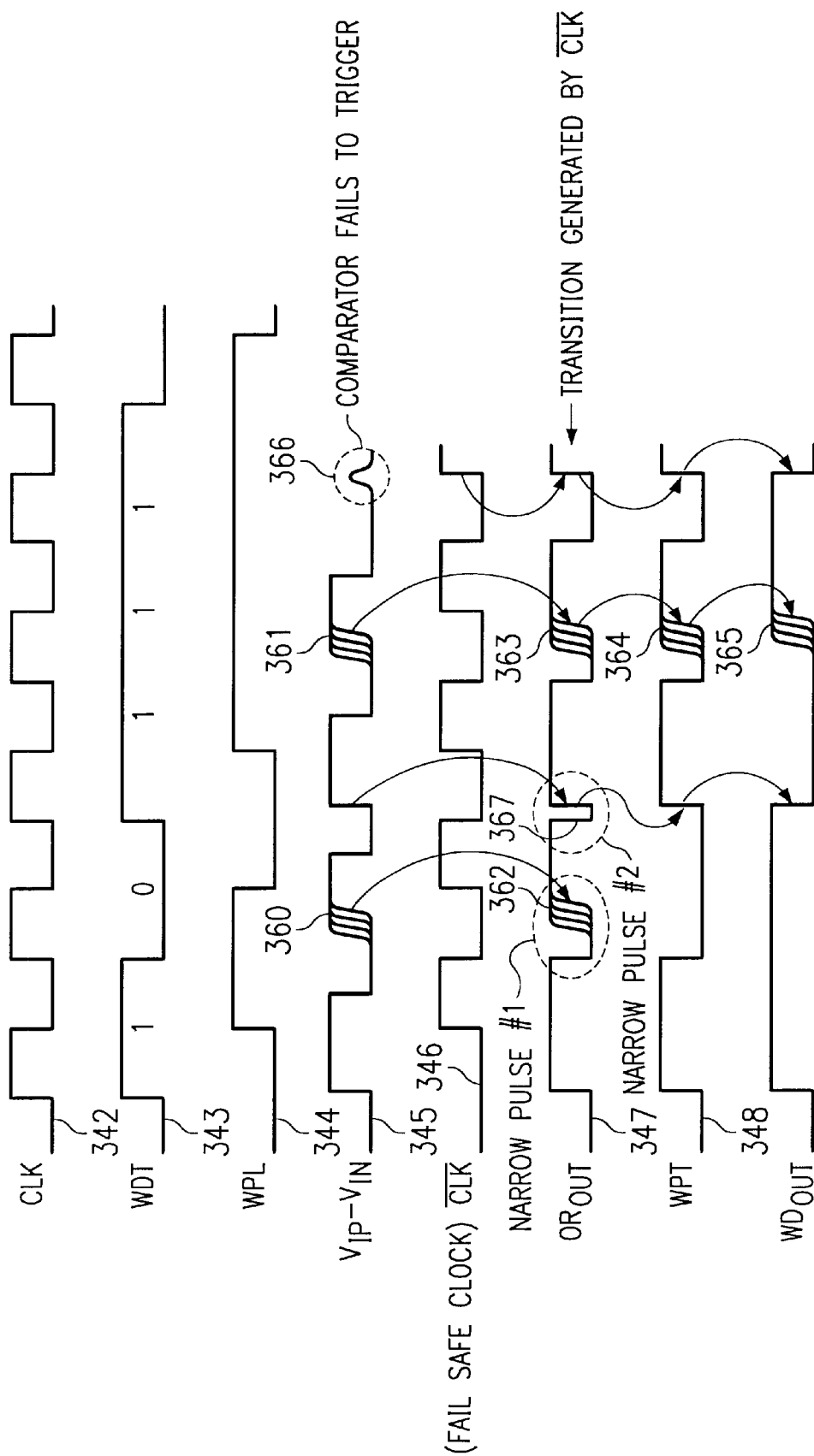

FIGS. 3a and 3b illustrate how the present invention avoids catastrophic failure of a write precompensation circuit. Catastrophic failure is avoided by ORing either the input (signals Vip and Vin) or the output (signals O1 and O*) of the comparator and the opposite phase of the clock. If the comparator fails to generate a transition, the 180 degree (half clock period) delayed clock will force a transition.

FIG. 3a is a schematic diagram illustrating an embodiment of the present invention.

FIG. 3a illustrates how the present invention avoids catastrophic failure of a write precompensation circuit. Catastrophic failure is avoided by ORing either the input (signals Vip and Vin) or the output (signals O1 and O1*) of the comparator and the opposite phase of the clock. If the comparator fails to generate a transition, the 180 degree delayed clock (or one half clock period delayed clock) will force a transition.

Figure 1:
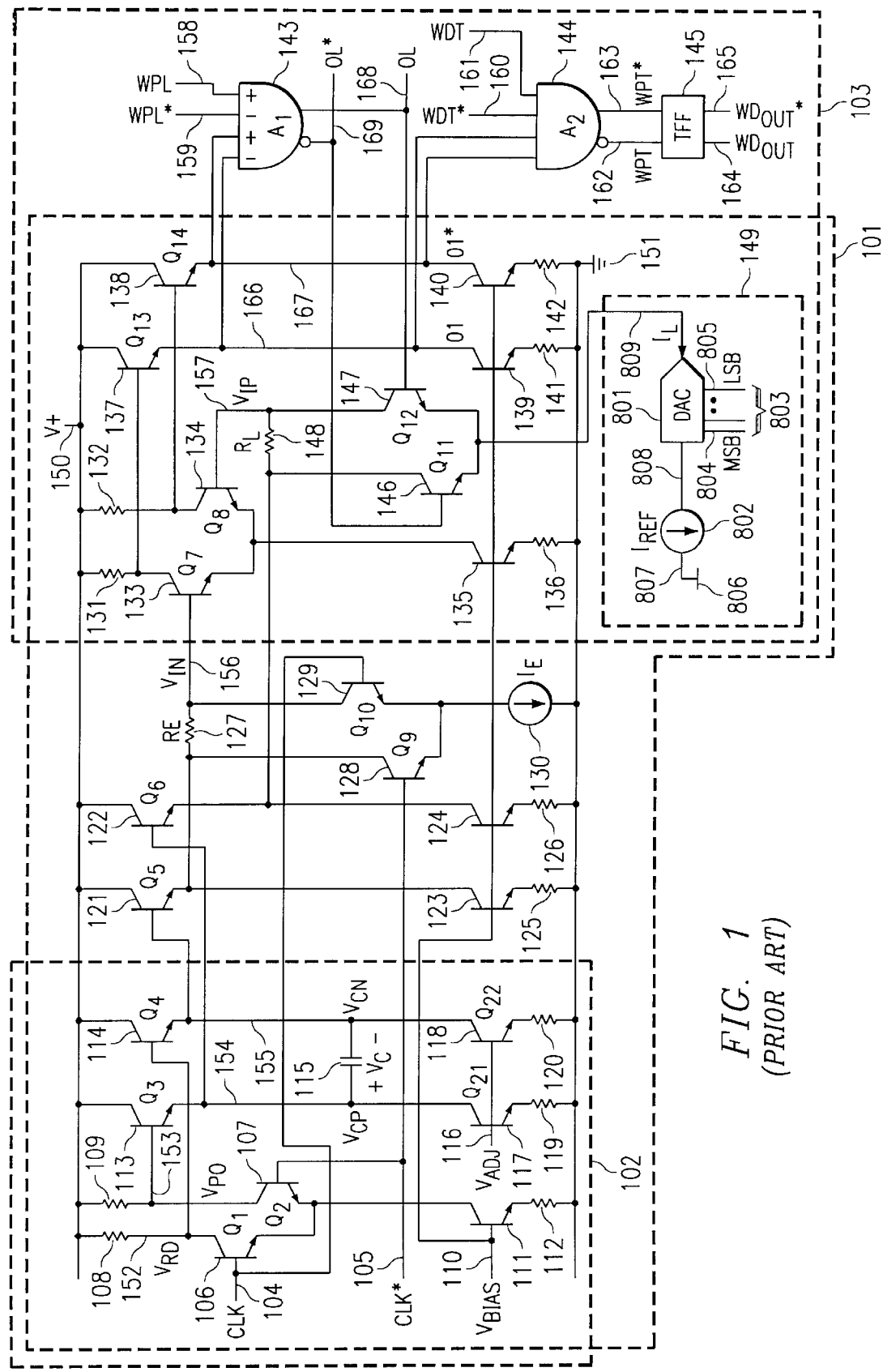
FIG. 1 is a schematic diagram illustrating a typical write precompensation circuit.

In FIG. 3a, although not illustrated in detail, circuit 101 of FIG. 1 is included and indicated as a block. Complementary inputs CLK at node 104 and CLK* at node 105 are coupled to circuit 101. Nodes 301 and 302 preferably pass complementary signals. Node 301, which may be coupled to node 166 (where signal O1 is present) or to node 157 (where signal Vip is present) of circuit 101, is coupled to a non-inverting side of a first input of OR gate 303. Node 302, which may be coupled to node 167 (where signal O1* is present) or to node 156 (where signal Vin is present) of circuit 101, is coupled to an inverting side of the first input of OR gate 303.

Nodes 304 and 305 preferably pass complementary signals. The non-inverting output of OR gate 303 at node 304 is coupled to a non-inverting side of a first input of AND gate 308. The inverting output of OR gate 303 at node 305 is coupled to an inverting side of the first input of AND gate 308.

Nodes 306 and 307 preferably pass complementary signals. Input WDT at node 306 is coupled to a non-inverting side of a second input of AND gate 308. Input WDT* at node 307 is coupled to an inverting side of the second input of AND gate 308.

Nodes 309 and 310 preferably pass complementary signals. The non-inverting output of AND gate 308 at node 309 is coupled to a non-inverting input of flip-flop 311. The inverting output of AND gate 308 at node 310 is coupled to an inverting input of flip-flop 311.

Nodes 312 and 313 preferably pass complementary signals. The non-inverting output of flip-flop 311 at node 312 provides output WDout. The inverting output of flip-flop 311 at node 313 provides output WDout*.

Node 167 of circuit 101 (where signal O1* is present) is coupled to a non-inverting side of a second input of AND gate 143. Node 166 of circuit 101 (where signal O1 is present) is coupled to an inverting side of the second input of AND gate 143. Input WPL at node 158 is coupled to a non-inverting side of a first input of AND gate 143. Input WPL* at node 159 is coupled to an inverting side of a first input of AND gate 143. A non-inverting output of AND gate 143 at node 168 provides output OL and is coupled to circuit 101. An inverting output of AND gate 143 at node 169 provides output OL* and is coupled to circuit 101.

Clock generating means 358 provides a CLK signal at node 104 and a CLK* signal at node 105. The CLK signal and the CLK* signal are complementary. Node 104 is coupled to a second clock input of delayed signal generating means 359. Node 105 is coupled to a first clock input of delayed signal generating means 359. Node 160, at which signal WDT is present, is coupled to a first signal input of delayed signal generating means 359. Node 161, at which signal WDT* is present, is coupled to a second signal input of delayed signal generating means 359. Delayed signal generating means 359 provides a WPL signal at node 158 and a WPL* signal at node 159. The WPL signal and the WPL* signal are (preferably) shown in complementary manner.

Figure 2:
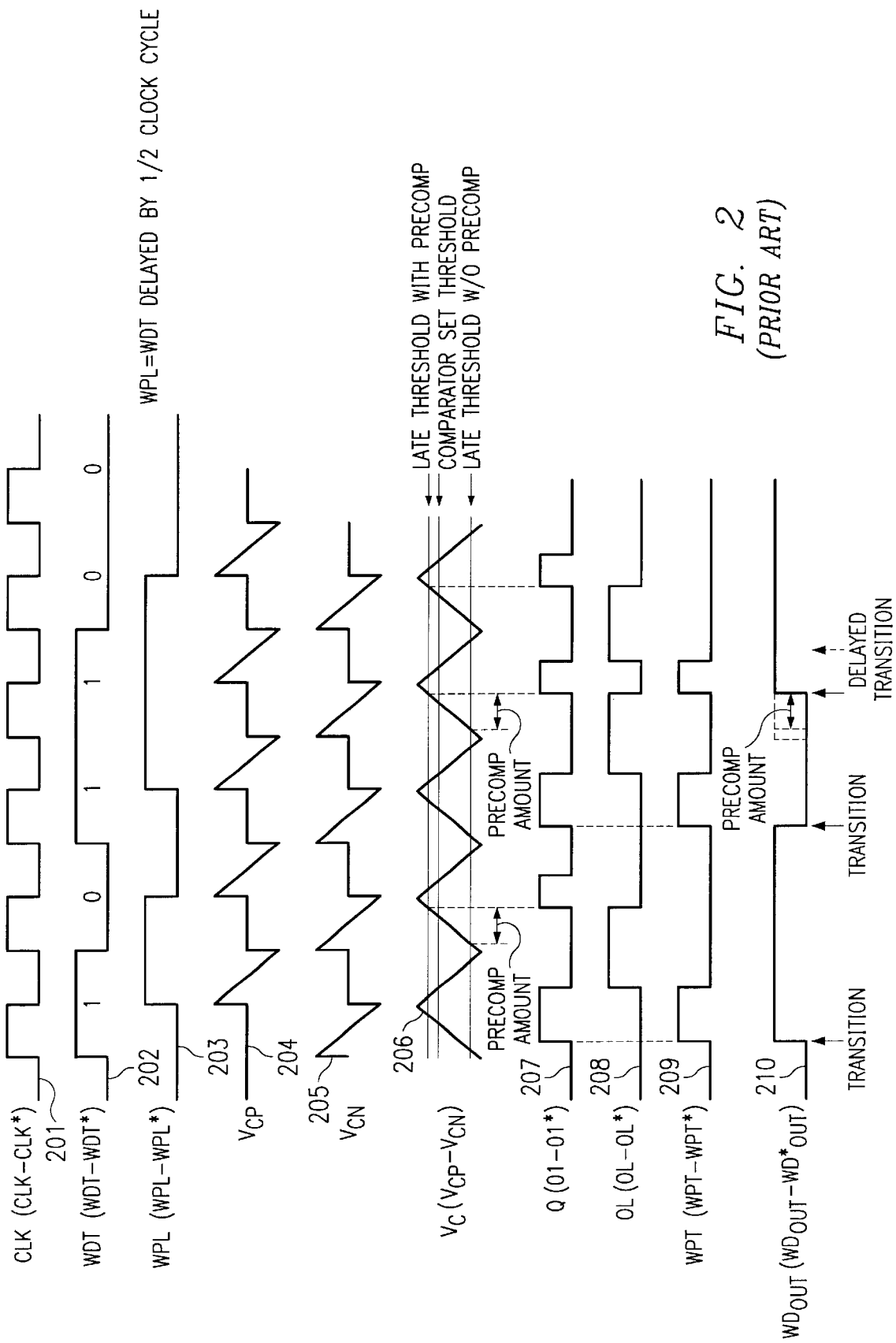
FIG. 2 is a timing diagram illustrating waveforms a relationships of the signals of the circuit of FIG. 1.

Complementary signals WPL at node 158 and WPL* at node 159 are the results, respectively, of delaying complementary signals WDT at node 160 and WDT* at node 161 by one half of a clock period, as illustrated in FIG. 2. Delayed signal generating means 359 is preferably a D flip-flop clocked by the complementary signals CLK* at node 105 and CLK at node 104.

Complementary clock signals CLK and CLK* are provided to logic gate 902. The inverted CLK input at node 105 is coupled to a first input of logic gate 902 and that the non-inverted CLK input at node 104 is coupled to a second input of logic gate 902. A first output of logic gate 902 at node 903 is coupled to a non-inverting terminal of a second input of OR gate 303. A second output of logic gate 902 at node 904 is coupled to an inverting terminal of a second input of OR gate 303.

Node 804, which conveys the MSB of digital information to DAC 801, is also coupled to an enable input of logic gate 902. Logic gate 902 is an element of circuit 901, which also comprises an OR gate, for example OR gate 303 or OR gate 328. When node 804 has a high logic level, the enable input of logic gate 902 allows logic gate 902 to pass the failsafe clock signals from its input to its output, thereby applying the failsafe clock signals to the input of an OR gate, for example, OR gate 303 or 328.

When node 804 has a low logic level, the enable input of logic gate 902 prevents the failsafe clock signals from being passed to the output of logic gate 902. Instead, the outputs of logic gate 902 at nodes 903 and 904 are held at levels representative of a low logic level at the second input of the OR gate. By holding the second input of the OR gate in such a manner, the OR gate becomes essentially transparent to signals between its first input and its output. Thus, as an example, when the enable input of logic gate 902 is disabled, the signals at nodes 301 and 302 pass through OR gate 303 and appear at nodes 304 and 305, respectively, without being altered by signals at the second input of OR gate 303.

Therefore, when node 804 has a low logic level, the enable input of logic gate 902 prevents the failsafe clock signals from influencing the output of OR gate 303 at nodes 304 and 305, thereby disabling the failsafe clock feature of the present invention. This feature may be safely and advantageously disabled when node 804 has a low logic level, as node 804 has a low logic level when only small amounts of precompensation are needed and the risk of narrow pulses occurring at the output of OR gate 303 is also small. Thus, the failsafe clock feature may be selectively enabled depending upon the amount of precompensation needed.

FIG. 3b is a timing diagram illustrating waveforms and timing relationships of the signals of the circuit in FIG. 3a.

Waveform 342 represents the signal CLK at node 104.
Waveform 343 represents the signal WDT at node 306.
Waveform 344 represents the signal WPL at node 158.
Waveform 345 represents the difference between the signal Vip at node 157 and the signal Vin at node 156 (i.e., Vip−Vin). Waveform 346 represents the failsafe clock, which is opposite phase of signal CLK at node 104. Since the signal CLK at node 104 and the signal CLK* at node 105 are preferably complementary, the failsafe clock may be obtained by interchanging the signal CLK at node 104 with the signal CLK* at node 105. Waveform 347 represents the signal ORout at node 304. Waveform 348 represents signal WPT at node 309. Waveform 349 represents signal WDout at node 312.

FIG. 3b illustrates waveforms of the circuit of FIG. 3a when the failsafe mechanism of the present invention is practiced. Pulses 360, 361, 362, 363, 364, 365, and 366 may be of varying width, depending upon the amount of precompensation invoked. Pulse 362 labelled "narrow pulse #1" can be very narrow if the failsafe mechanism is always invoked and a small amount of precompensation is invoked. Since it may be undesirable to leave the failsafe mechanism enabled continuously and risk having narrow pulses, the present invention may be practiced with logic built into the circuit to enable failsafe only when large precompensation is required.

Figures 1, 3C:
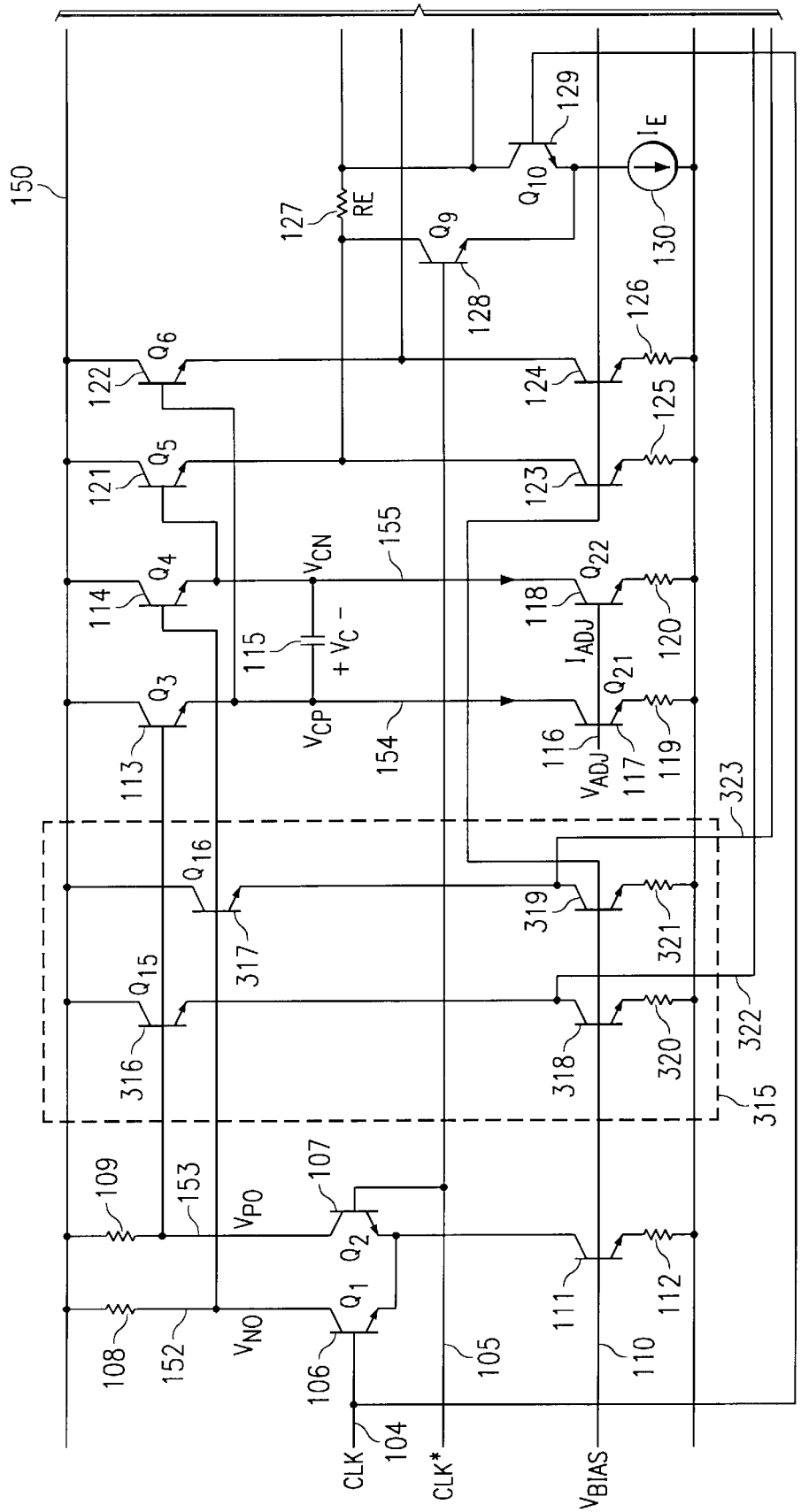
FIG. 3c is a schematic diagram illustrating an embodiment of the present invention.
Figures 2, 3C:
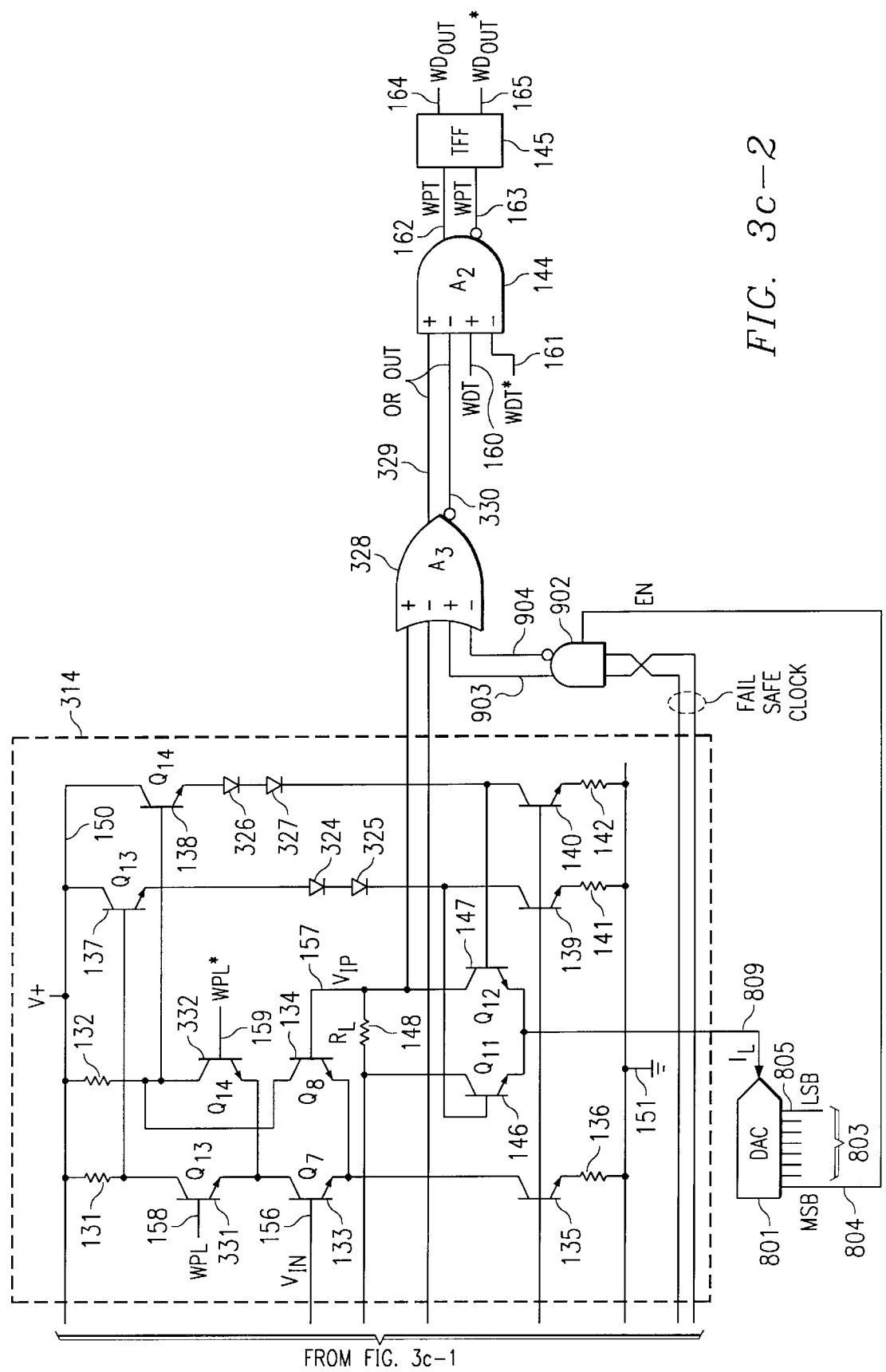

FIG. 3c is a schematic diagram illustrating a superior implementation based on the same principle as FIG. 3a.

FIG. 3c has the following differences from the circuit of FIG. 1. First, the fail safe clock is, for better control, generated internally by buffering the CLK and CLK* signals through a pair of emitter followers comprising transistors 316, 317, 318, and 319 and resistors 320 and 321. Second, AND gate 143 of FIG. 1 is moved inside the main body of the write precompensation circuit by adding transistors 331 and 332. This helps speed up the regenerative action of comparator 314. ANDing is accomplished with transistors 133, 134, 331, and 332. OR gate 328 in FIG. 3c, in essence, becomes the comparator whose positive going transition dictates the write timing. Third, to avoid the occurrence of narrow pulse #1 in FIG. 3b, the MSB of the DAC is used to enable or disable the failsafe mechanism. With this, the failsafe mechanism is invoked only when the most significant bit (MSB) is high. Certainly it is possible to choose to invoke the mechanism under a different DAC setting besides when the MSB is high.

Figures 1, 3D:
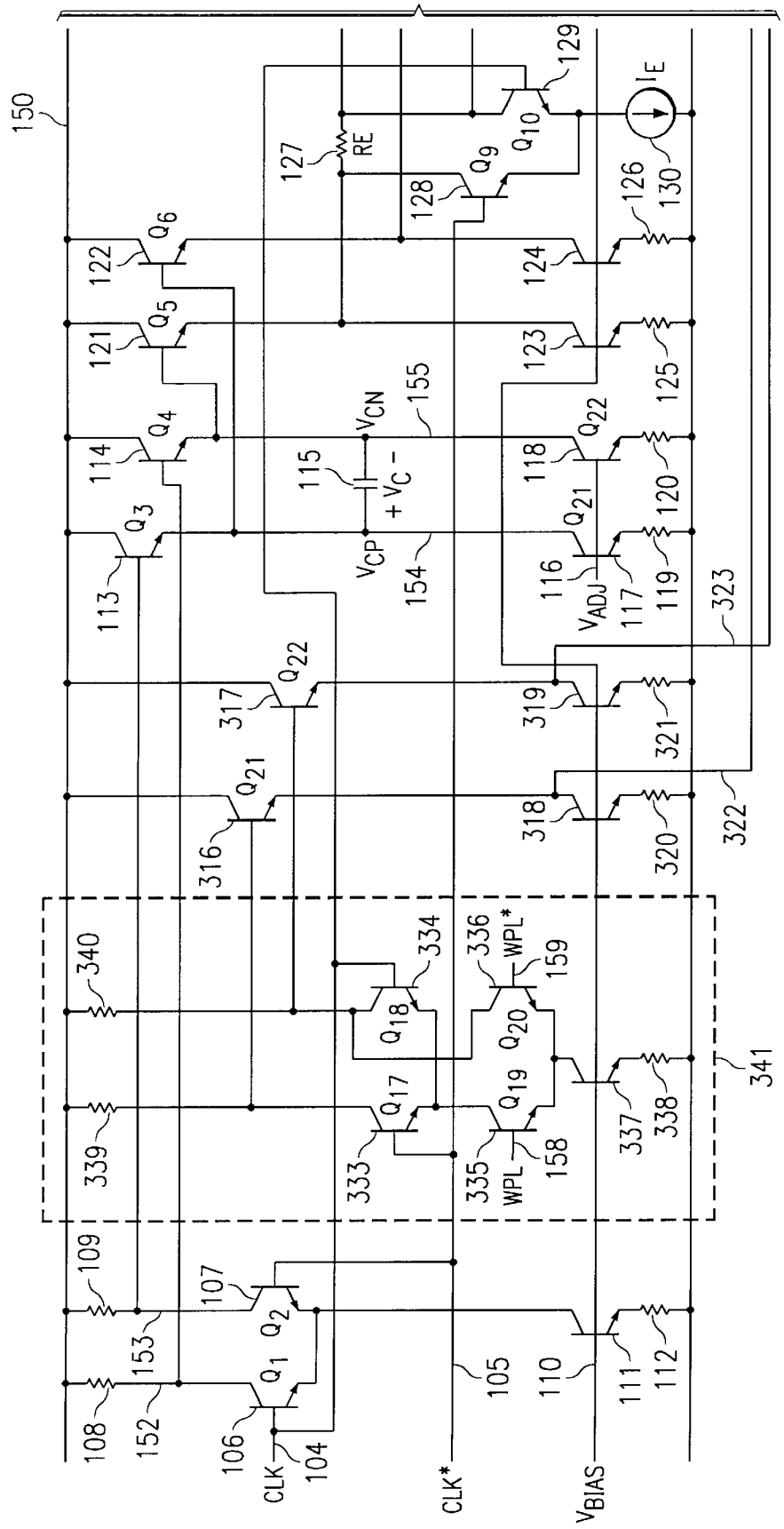
FIG. 3d is a schematic diagram illustrating an embodiment of the present invention.
Figures 2, 3D:
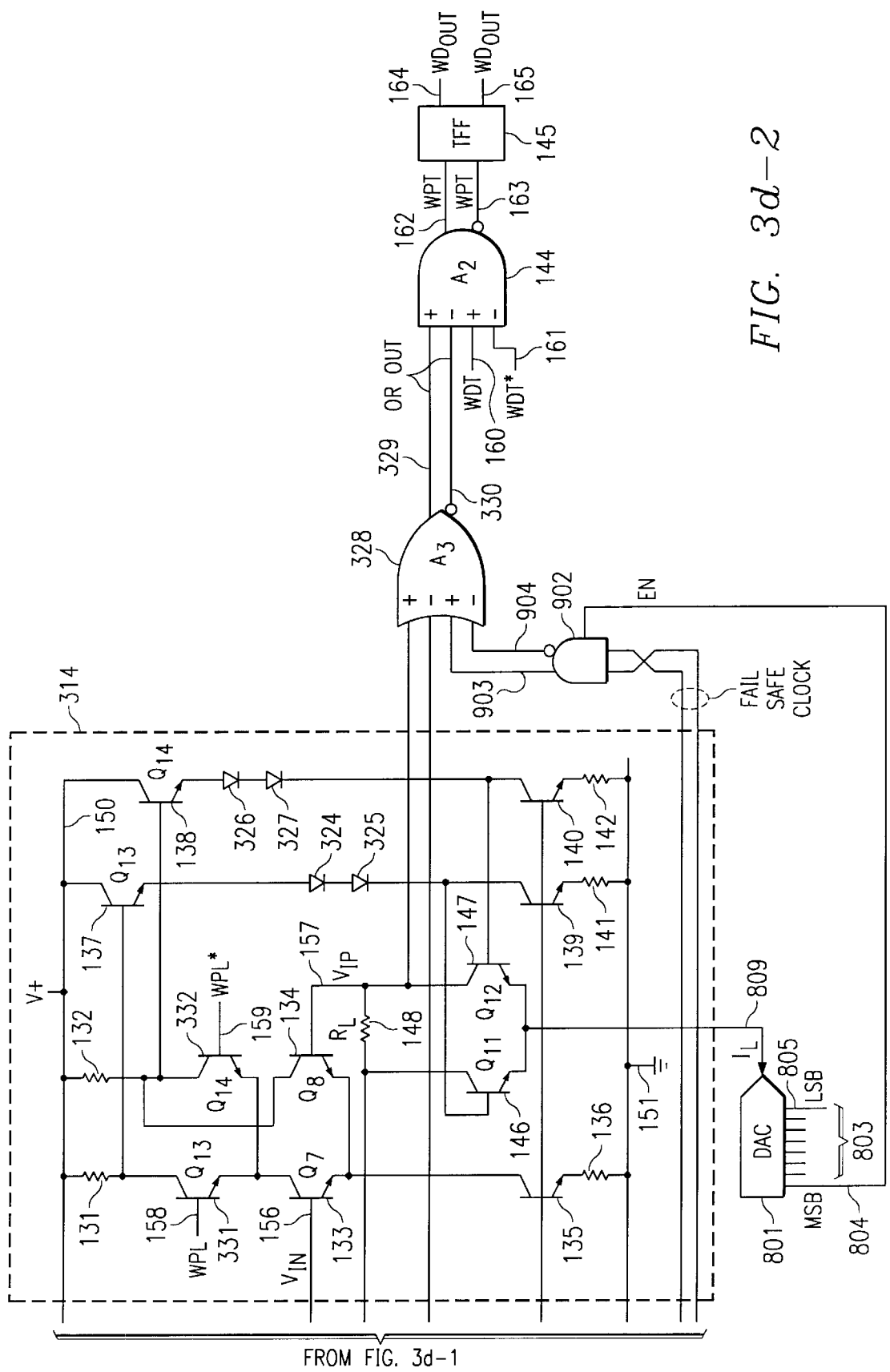

FIG. 3d is a schematic diagram illustrating an embodiment of the present invention.

FIG. 3d illustrates an embodiment of the present invention in which the narrow pulse at nodes 329 and 330 (signal ORout) shown in waveform 347 of FIG. 3b as pulse 367 ("narrow pulse #2") is avoided. This narrow pulse is avoided by ANDing the failsafe clock (signal CLK* at node 105) with signal WPL at node 158. By avoiding the narrow pulse at the output or OR gate, the present invention makes the write compensation circuit less susceptible to noise and jitter.

The circuit of FIG. 3d has the following differences from the circuit in FIG. 3c. Complementary inputs CLK at node 104 and CLK* at node 105 are coupled to transistors 334, 106, and 129, and to transistors 333, 107, and 128, respectively. Input CLK at node 104 is coupled to the base of transistor 334 as well as to the base of transistor 106 and to the base of transistor 129. Input CLK* at node 105 is coupled to the base of transistor 333 as well as to the base of transistor 107 and to the base of transistor 128. Positive voltage supply V+ is coupled to the first terminal of resistor 339 and to the first terminal of resistor 340. The second terminal of resistor 339 is coupled to the base of transistor 316 and to the collector of transistor 333. The second terminal of resistor 340 is coupled to the base of transistor 317, to the collector of transistor 334, and to the collector of transistor 336. The emitter of transistor 333 and the emitter of transistor 334 are coupled to the collector of transistor 335. Complementary inputs WPL at node 158 and WPL* at node 159 are coupled to the base of transistor 335 and to the base of transistor 336, respectively. The emitter of transistor 335 and the emitter of transistor 336 are coupled to the collector of transistor 337. Input Vbias at node 110 is coupled to the base of transistor 337 as well as to the bases of transistors 111, 318, 319, 123, 124, 135, 139, and 140. The emitter of transistor 337 is coupled to the first terminal of resistor 338. The second terminal of resistor 338 is coupled to ground at node 151.

Figure 3E:
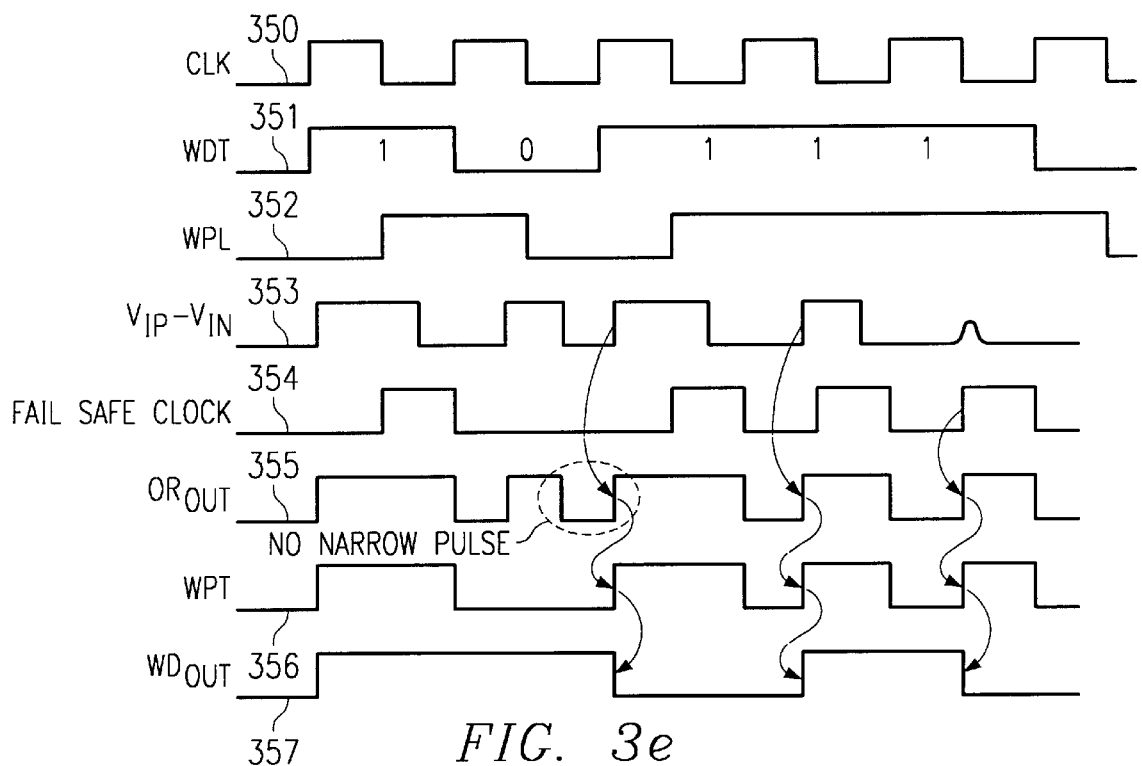
FIG. 3e is a timing diagram illustrating waveforms and timing relationships of signals of the circuit of FIG. 3d.

FIG. 3e is a timing diagram illustrating waveforms and timing relationships of signals of the circuit of FIG. 3d.

FIG. 3e shows that the narrow pulse #2 of FIG. 3b is no longer present and has been avoided by the present invention.

Figure 4A:
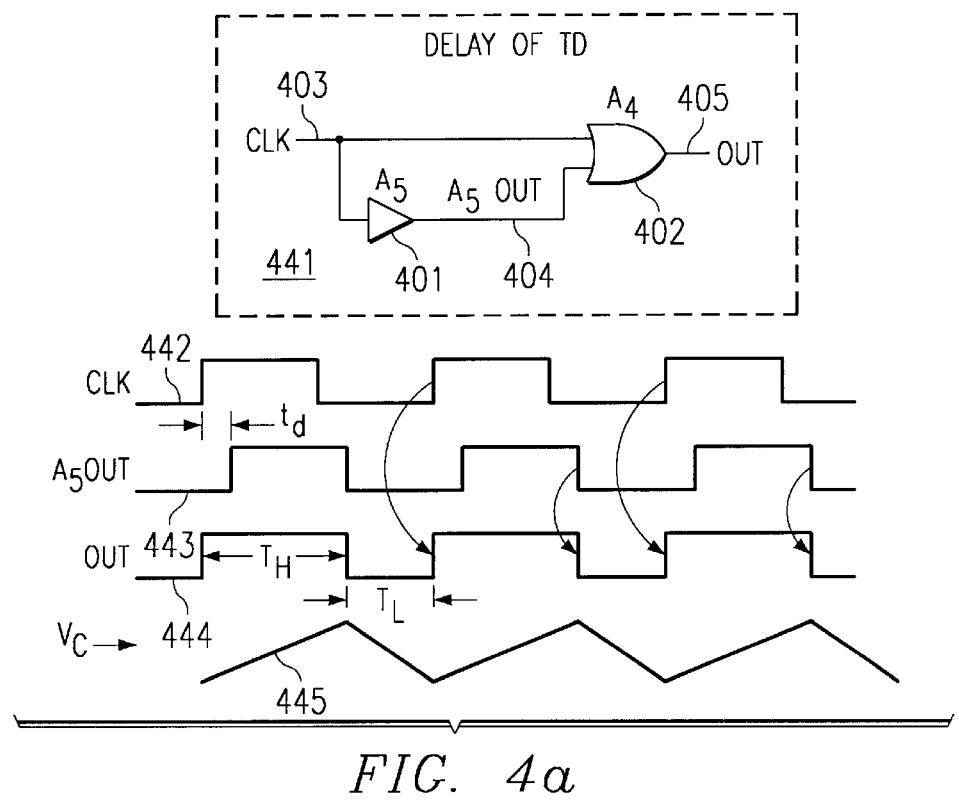
FIG. 4a is a schematic diagram illustrating an embodiment of the present invention for extending the range of precompensation and a corresponding timing diagram illustrating waveforms and timing relationships of signals of the circuit.

FIG. 4a is a schematic diagram illustrating an embodiment of the present invention for extending the range of precompensation by increasing the duty cycle of the clock signal and a corresponding timing diagram illustrating waveforms and timing relationships of signals of the circuit.

The circuit of FIG. 4a comprises circuit 441, which comprises delay element 401 and OR gate 402. Input CLK 403 is coupled to a first input of OR gate 402 and to an input of delay element 401. The output of delay element 401 at node 404 is coupled to a second input of OR gate 402. The output of OR gate 402 provides output OUT.

FIG. 4a illustrates how the present invention extends the range of precompensation. The clock signal CLK at node 104 and the clock signal delayed by td at node 404 are ORed to change the duty cycle of the clock signal. The extended period TH in FIG. 4a is used to generate longer precompensation delay.

Figure 4B:
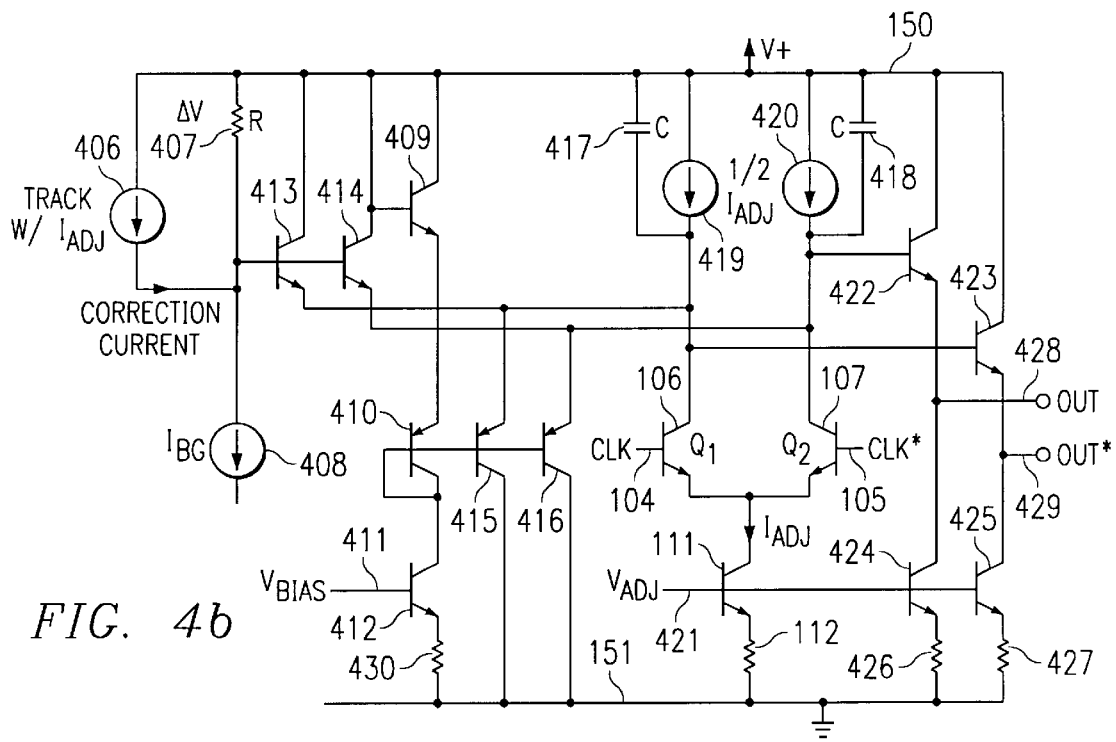
FIG. 4b is a schematic diagram illustrating a delay generator according to the present invention.

FIG. 4b is a schematic diagram illustrating a delay generator according to the present invention.

Positive voltage supply V+ at node 150 is coupled to a first terminal of current source 406, to a first terminal of resistor 407, to the collector of transistor 413, to the collector of transistor 414, to the base of transistor 409, and to the collector of transistor 409. The second terminal of current source 406 is coupled to the second terminal of resistor 407, to the base of transistor 413, to the base of transistor 414, and to the first terminal of current source 408.

Input Vbias at node 411 is coupled to the base of transistor 412. The emitter of transistor 409 is coupled to the emitter of transistor 410. The collector of transistor 410 is coupled to the base of transistor 410, to the base of transistor 415, to the base of transistor 416, and to the collector of transistor 412. The emitter of transistor 412 is coupled to a first terminal of resistor 430. A second terminal of resistor 430 is coupled to ground at node 151.

Positive voltage supply V+ at node 150 is coupled to the first terminal of capacitor 417, to the first terminal of current source 419, to the first terminal of current source 420, and to the first terminal of capacitor 418. The emitter of transistor 413 is coupled to the emitter of transistor 415, to the second terminal of capacitor 417, to the second terminal of current source 419, to the collector of transistor 106, and to the base of transistor 423. The emitter of transistor 414 is coupled to the emitter of transistor 416, to the second terminal of capacitor 418, to the second terminal of current source 420, to the collector of transistor 107, and to the base of transistor 422. The collector of transistor 415 and the collector of transistor 416 are coupled to ground at node 151.

Input CLK at node 104 is coupled to the base of transistor 106. Input CLK* at node 105 is coupled to the base of transistor 107. The emitter of transistor 106 and the emitter of transistor 107 are coupled to the collector of transistor 111. Input Vadj at node 421 is coupled to the base of transistor 111, to the base of transistor 424, and to the base of transistor 425. The emitter of transistor 111 is coupled to a first terminal of resistor 112. The second terminal of resistor 112 is coupled to ground at node 151.

Positive voltage supply V+ at node 150 is coupled to the collector of transistor 422 and to the collector of transistor 423. The emitter of transistor 422 is coupled to the collector of transistor 424 and to output OUT at node 428. The emitter of transistor 423 is coupled to the collector of transistor 425 and to output OUT* at node 429. The emitter of transistor 424 is coupled to the first terminal of resistor 426. The emitter of transistor 425 is coupled to the first terminal of resistor 427. The second terminal of resistor 426 and the second terminal of resistor 427 are coupled to ground at node 151.

FIG. 4b shows how the present invention generates the delay td (with delay element 401 of FIG. 4a) in a controlled manner. By slaving the current Iadj in FIG. 4b to Vadj of the time base generator, td is made approximately constant as a percentage of the basic clock period. The delay td=ΔV/Iadj and, therefore, is inversely proportional to Iadj, or, simply put, tracks with the data rate. Thus, the duty cycle becomes data rate independent to the first order. The duty cycle (TH/Ttotal), however will vary slightly as data rate is increased. This is because the delay, td, is comprised of two parts, one that tracks with data rate and the other which remains relatively constant. A small correction current can be inserted as shown in FIG. 4b to maintain constant duty cycle over broad data rate.

Figure 4C:
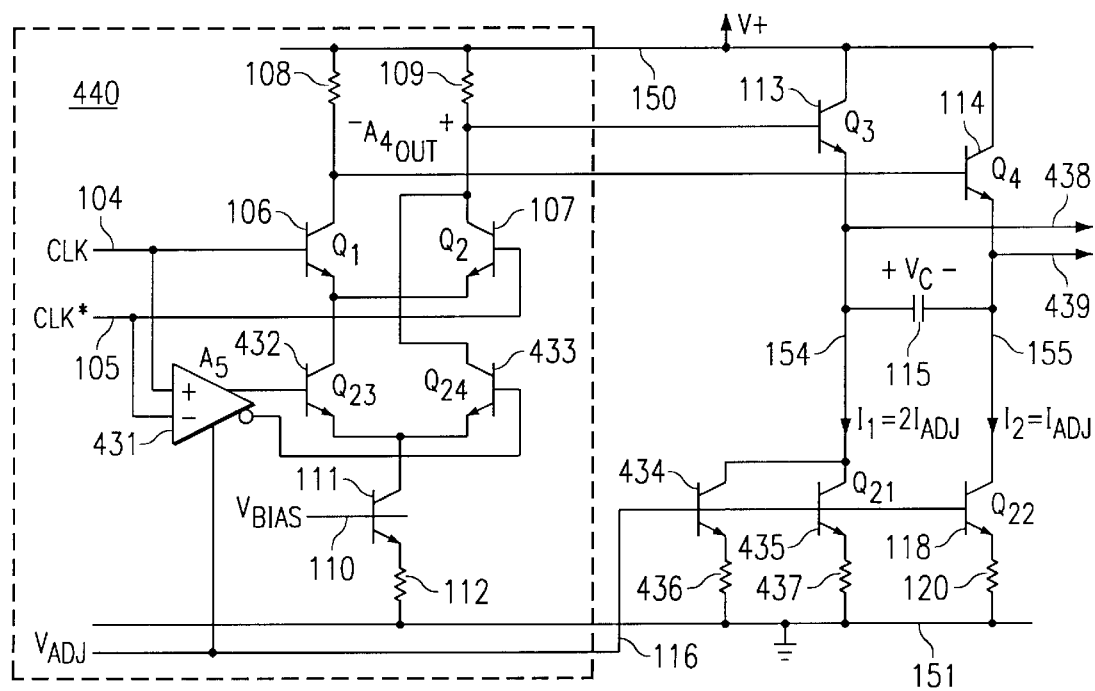
FIG. 4c is a schematic diagram illustrating a timing generator that provides extension of the precompensation range according to the present invention.
Figure 4C:
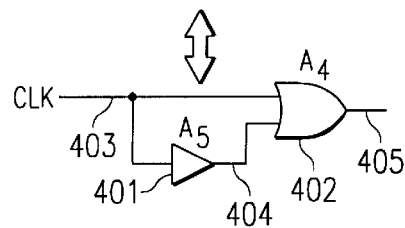

FIG. 4c is a schematic diagram illustrating a timing generator that provides extension of the precompensation range according to the present invention.

Circuit 440 comprises delay element 431, transistor 106, transistor 107, transistor 432, transistor 433, transistor 111, resistor 108, resistor 109, and resistor 112.

Input CLK at node 104 is coupled to the base of transistor 106 and to a non-inverting input of delay element 431. Input CLK* at node 105 is coupled to the base of transistor 107 and to an inverting input of delay element 431. The non-inverting output of delay element 431 is coupled to the base of transistor 432. The inverting output of delay element 431 is coupled to the base of transistor 433.

Positive voltage supply V+ at node 150 is coupled to a first terminal of resistor 108, to a first terminal of resistor 109, to the collector of transistor 113, and to the collector of transistor 114. The second terminal of resistor 108 is coupled the collector of transistor 106 and to the base of transistor 114. The second terminal of resistor 109 is coupled to the collector of transistor 107, to the collector of transistor 433, and to the base of transistor 113. The emitter of transistor 106 and the emitter of transistor 107 are coupled to the collector of transistor 432. The emitter of transistor 432 and the emitter of transistor 433 are coupled to the collector of transistor 111. Input Vbias at node 110 is coupled to the base of transistor 111. The emitter of transistor 111 coupled to the first terminal of resistor 112. The second terminal of resistor 112 is coupled to ground at node 151.

Input Vadj at node 116 is coupled to an input of delay element 431 and to the base of transistor 434, to the base of transistor 435, and to the base of transistor 118. The emitter of transistor 113 is coupled to output 438 at node 154, to a first terminal of capacitor 115, to the collector of transistor 434, and to the collector of transistor 435. The emitter of transistor 114 is coupled to output 439 at node 155, to the second terminal of capacitor 115, and to the collector of transistor 118. The emitter of transistor 434 is coupled to a first terminal of resistor 436. The emitter of transistor 435 is coupled to a first terminal of resistor 437. The emitter of transistor 118 is coupled to a first terminal of resistor 120. The second terminal of resistor 436, the second terminal of resistor 437, and the second terminal of resistor 120 are coupled to ground at node 151.

FIG. 4c illustrates the use of the present invention to extend the range of the write precompensation circuit of FIG. 1. OR gate 402 of FIG. 4a is preferably built into the input stage of the timing generator. For charge conservation, it is noted that I1*TL=I2*TH (where I1 is the current through node 154, I2 is the current through node 155, TL is the time the clock signal CLK remains at a low logic level, and TH is the time the clock signal remains at a high logic level) must hold, or else the bias point of the triangle timing generator will shift out of the linear range. Typically, to get a predictable ratio of I1 to I2, the ratio should be limited to one easily implementable in an integrated circuit (IC), for example, 2. The swing ΔV should be adjusted to yield such a duty cycle. (The ratio of 2 would correspond to 66.7% duty cycle.) Typically the swing is generated off a bandgap voltage such that it is process and temperature independent.

Figure 4D:
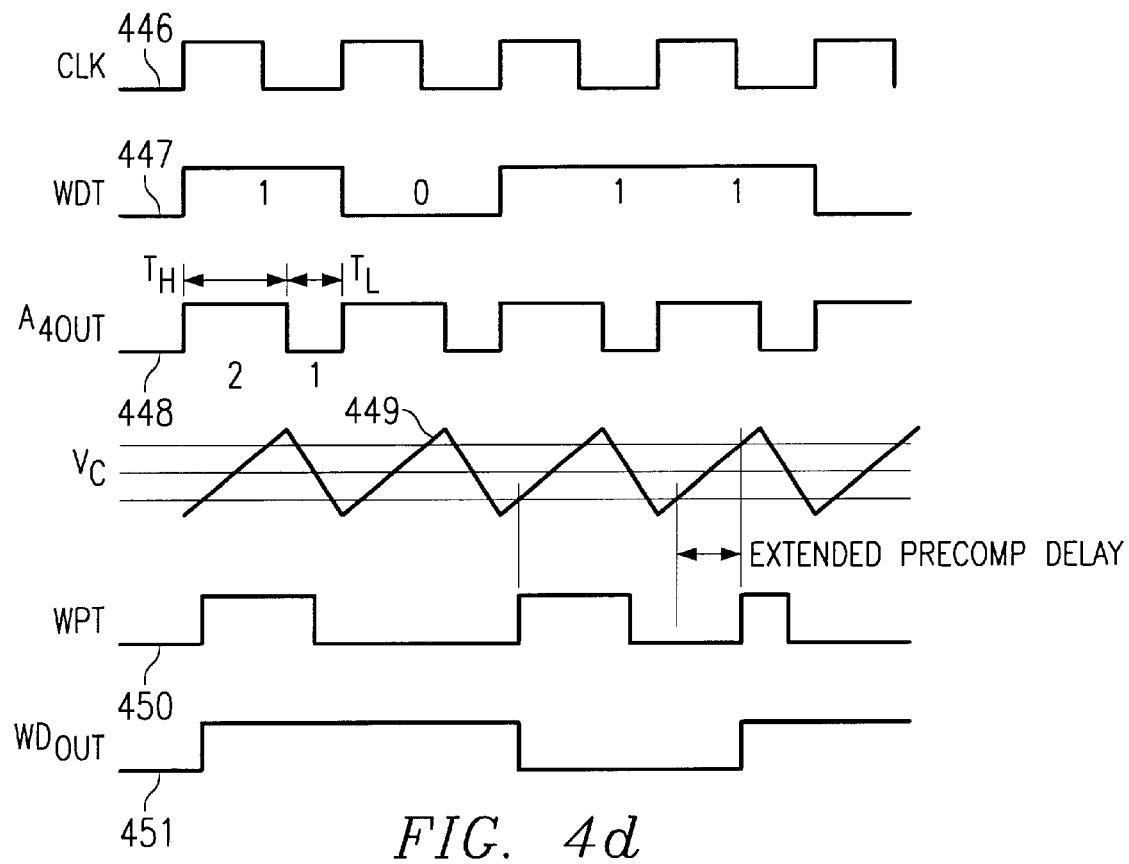
FIG. 4d is a timing diagram illustrating waveforms and timing relationships of signals of the timing generator of FIG. 4c.

FIG. 4d is a timing diagram illustrating waveforms and timing relationships of signals of the timing generator of FIG. 4c.

Waveform 446 represents the clock signal CLK at node 104. Waveform 447 represents signal WDT at node 160. Waveform 448 represents the signal across nodes 109 and 108. Waveform 449 represents the signal Vc across capacitor 115. Waveform 450 represents the signal WPT at node 162. Waveform 451 represents the signal WOout at node 164.

Thus, a method and apparatus for preventing catastrophic failure (i.e., failsafing) and extending the range of a write precompensation circuit has been provided.

What is claimed is:

1. A method for improving performance of a write precompensation circuit comprising the steps of:
   providing a clock signal;
   delaying said clock signal to produce a delayed clock signal;
   forming an extended duty cycle clock signal based on the logical OR of clock signal and said delayed clock signal.

2. The method of claim 1 further comprising the step of:
   compensating said extended duty cycle clock signal to maintain a constant duty cycle over a broad frequency range of said clock signal.

3. The method of claim 2 wherein said clock signal, said delayed clock signal, said extended duty cycle clock signal are differential signals.

4. A write precompensation circuit comprising:
   a clock generating circuit for providing a clock signal;
   a delay circuit for delaying said clock signal and for producing a delayed clock signal;
   an OR gate for receiving said clock signal and said delayed clock signal and for forming an extended duty cycle clock signal.

5. The write precompensation circuit of claim 4 further comprising:
   a compensation means for compensating said extended duty cycle clock signal to maintain a constant duty cycle over a broad frequency range of said clock signal.

6. The write precompensation circuit of claim 5 wherein said clock signal, said delayed clock signal, said extended duty cycle clock signal are differential signals.

* * * * *